(12) United States Patent
Callegari et al.

(10) Patent No.: US 7,688,280 B2
(45) Date of Patent: *Mar. 30, 2010

(54) EXPANDED BIT MAP DISPLAY FOR MOUNTING ON A BUILDING SURFACE AND A METHOD OF CREATING SAME

(75) Inventors: Mark R. Callegari, Overland Park, KS (US); Michael J. Gassman, Kansas City, MO (US)

(73) Assignee: LightWild, L.C., Overland Park, KS (US)

( * ) Notice: Subject to any disclaimer, the term of this patent is extended or adjusted under 35 U.S.C. 154(b) by 1221 days.

This patent is subject to a terminal disclaimer.

(21) Appl. No.: 10/948,428

(22) Filed: Sep. 23, 2004

(65) Prior Publication Data

US 2005/0259036 A1 Nov. 24, 2005

Related U.S. Application Data

(63) Continuation-in-part of application No. 10/848,222, filed on May 18, 2004.

(51) Int. Cl.
 *G09G 5/00* (2006.01)
(52) U.S. Cl. ............... 345/1.3; 362/236; 362/249.02
(58) Field of Classification Search .......... 345/30, 345/1.3, 39, 40, 44; 362/249, 153, 236, 249.02 362/249.11, 249.16; 40/551, 544, 451, 452, 40/553, 564, 573
See application file for complete search history.

(56) References Cited

U.S. PATENT DOCUMENTS

| | | | | |
|---|---|---|---|---|
| 4,965,752 A | | 10/1990 | Keith | |
| 5,771,617 A | * | 6/1998 | Baker | 40/544 |
| 5,815,970 A | * | 10/1998 | Thalenfeld et al. | 40/642.01 |
| 6,392,368 B1 | * | 5/2002 | Deller et al. | 315/317 |
| 6,932,368 B1 | | 5/2002 | Deller et al. | |
| 6,402,336 B1 | * | 6/2002 | Reese | 362/103 |
| 2005/0259418 A1 | * | 11/2005 | Callegari et al. | 362/249 |

OTHER PUBLICATIONS www.mainlight.com/softled/brochure/softledbrojpg/page6.htm; Author unknown; Date unknown.
www.mainlight.com/softled/brochure/softledbrojpg/page7.htm; Author unknown; Date unknown.
Lighting Dimensions; Article entitled: Color Kinetics and Main Light Industries to Co-Produce LED-based Drapery; Author unknown; May 10, 2004.
Light System Manager; Color Kinetics; Author unknown; Date unknown.
iColor Fresco Brochure; Color Kinetics; Author unknown; Date unknown.

(Continued)

*Primary Examiner*—Abbas I Abdulselam
(74) *Attorney, Agent, or Firm*—Hovey Williams LLP

(57) ABSTRACT

An expanded bit map display ("EBMD") (10) for displaying an image (14) and a method of creating such for mounting the EBMD (10) to a building surface (12) is provided. The EBMD (10) is a large-scale colored light display comprising a plurality of intelligent light fixtures (16) having a microprocessor and a memory and mounted to the building surface (12). Each light fixture (16) is separately addressable and operable to store lighting characteristics or information. Groups of light fixtures (16) are in communication with a central processor operable to communicate control protocol.

33 Claims, 8 Drawing Sheets

OTHER PUBLICATIONS

JumboTron Brochure: JTS-L15 Jumbotron LED Large Screen Display System; Author unknown; Date unknown.

Callegari, Mark et al, U.S. Appl. No. 10/640,222, filed May 18, 2004; An Expanded Bit Map Display for Mounting on a Building Surface and a Method of Creating Same.

Restriction Requirement Office Action dated Sep. 12, 2008, in U.S. Appl. No. 10/848,222, filed May 18, 2004; Inventor: Callegari, Mark R. et al.

Non-Final Office Action dated Dec. 17, 2008, in U.S. Appl. No. 10/848,222, filed May 18, 2004; Inventor: Callegari, Mark R. et al.

Amendment dated Feb. 2, 2009 filed in response to Office Action dated Dec. 17, 2008 in U.S. Appl. No. 10/848,222, filed May 18, 2004; Inventor: Callegari, Mark R. et al.

Final Office Action dated Dec. 4, 2009, in U.S. Appl. No. 10/848,222, filed May 18, 2004; Inventor: Callegari, Mark R. et al.

* cited by examiner

EXPANDED BIT MAP DISPLAY FOR MOUNTING ON A BUILDING SURFACE AND A METHOD OF CREATING SAME

RELATED APPLICATIONS

The present application is a continuation-in-part and claims priority benefit, with regard to all common subject matter, of an earlier-filed U.S. patent application titled "AN EXPANDED BIT MAP DISPLAY FOR MOUNTING ON A BUILDING SURFACE AND A METHOD OF CREATING SAME", Ser. No. 10/848,222, filed May 18, 2004. The identified earlier-filed application is hereby incorporated by reference into the present application.

BACKGROUND OF THE INVENTION

1. Field of the Invention

The present invention relates to light displays for displaying an image or a sequence of images on buildings or other surfaces. More particularly, the invention relates to a large-scale light display for mounting on a building surface comprising a plurality of light fixtures mounted directly to the building surface or via a mounting assembly. The light display is then operable to display an image or a sequence of images as a static or an animated image.

2. Description of the Related Art

Large-screen colored light display systems have become very popular and can be found everywhere from sports arenas to outdoor commercial venues, such as Times Square in New York City. These display systems are often extremely large with display screens covering hundred to thousands of square feet. The systems can receive both analog and digital input and display animated and static pictures, including full motion pictures, still pictures, and computer graphics.

Such large-screen display systems commonly use a plurality of light emitting diodes ("LEDs") arranged in a uniform array on a thin screen. The LEDs are arranged in groups of three, with a red, a blue, and a green LED forming a pixel. Together, the red, blue, and green LEDs can produce a plurality of varying colors. The pixels are aligned in uniform rows and columns with a separation distance or pixel pitch of as little as less than one inch. The pixel density is thus very large and can include density values of over 4,000 pixels per square yard. The screen on which the pixels are arrayed is also extremely thin and can be less than one inch thick. Because of the size of such display systems, they are often mounted in interconnecting modules, which facilitates handling and repair of the system. Many examples of popular large-screen display systems are sold by Sony Corp. under the trademark "JUMBOTRON."

Large-screen display systems offer several disadvantages if placement of the display on a building surface is desired. First, the systems require a screen on which to mount the LEDs. The screen, or plurality of smaller modular screens, is then mounted directly onto the building surface or into a separate support and mounting structure. If mounted on the building surface, the screen necessarily covers large sections of the building. These covered sections may include windows or aesthetic features of the building, such that concealing these sections is not aesthetically pleasing.

Another disadvantage of large-screen display systems is the cost involved in constructing and maintaining the displays. Although the cost is largely dependent on the size of the system, large-scale systems often cost several million dollars to manufacture and install. Additionally, the systems require frequent and expensive maintenance.

Other light display systems for mounting on buildings or building surfaces are also known in the art. Such display systems may include multiple rows of light fixtures, with each light fixture including a plurality of LEDs (or configurations of red, green, and blue LEDs) mounted on the light fixture and arranged side-by-side at a distance of approximately less than one inch. The light fixtures are commonly configured as a track or other linear, unitary assembly, and multiples tracks are mounted to the building surface to produce the row of light fixtures. The light fixtures are usually at least one foot long and multiple light fixtures are aligned end-to-end to produce each row of the display. Therefore, the multiple rows of the display must be mounted on locations of the building that do not include obstructions, windows, columns, pipes, or other types of irregularities that are commonly interspersed throughout a building surface's substrate. Otherwise, the light fixture will cover the irregularities, which may either be impossible if the irregularities jut out from the building surface, or aesthetically and functionally unwanted if the light fixtures cover a window, for example.

An even further disadvantage of prior art large-screen display systems is the required wiring and bus implementation for interconnecting individual light fixtures to an intelligence source. Because prior art large-screen display systems do not use intelligent lighting, i.e., light fixtures having an internal microprocessor and a memory, then each light fixture must be controlled via a remote intelligence source. This necessarily increases the wiring that must interconnect the light fixtures to the intelligence source. Such requirements are irrelevant in large-scale systems having common support surfaces on which and behind which the wires may be run, such as JUMBOTRONS. However, if the display is to be mounted on a building surface without a common support, or even if the display is to be mounted on a surface having a common support but still requiring each light fixture to be separated by a relatively large distance, then the wiring of such light fixtures is largely determinative of the type of images that can be displayed and of the cost, aesthetic, and actual, physical capability of wiring the display.

For example, it may be impractical, for either physical or cost reasons, to wire large-scale displays, even on a common support, to a single intelligence source. Each light fixture requires three cables or wires to extend therefrom for power and control of each color (red, green, and blue). Additionally, a common wire for providing power to the light fixtures must be interconnected with all light fixtures. Therefore, a group of ten fixtures may have as many as thirty-one wires extending therefrom and connected to a central intelligence source. Because each light fixture is not intelligent, the central intelligence source must provide sufficient processing speed to separately address and control each light fixture. If multiple groups of light fixtures are needed, which is often necessary for large-scale displays, then the amount of wires or cables required to intelligently control the fixtures can be upwards of three hundred ten wires for ten groups of ten light fixtures. Because large-scale displays may have several hundred light fixtures, the demands of aesthetically and logistically mounting the wires, especially if there is no common support for the light fixtures, must be considered.

Accordingly, there is a need for an improved light display and method of creating such for mounting on a building surface that overcomes the limitations of the prior art. More particularly, there is a need for a light display that does not require the light producing elements, such as the LEDs, to be mounted to a screen or other uniform support so as to mount the LEDs to the building surface. Additionally, there is a need for a light display that can mount to the building surface without covering or interfering with the building surface's irregularities. Further, there is a need for a light display that can cost-effectively display a large-scale image on a building surface. There is also a need for a large-scale display that limits the number of wires or cables necessary for controlling the light fixtures.

SUMMARY OF THE INVENTION

The present invention solves the above-described problems and provides a distinct advance in the art of light displays for mounting to a building surface. More particularly, the present invention provides an expanded bit map display ("EBMD") and a method of creating such that is configured to mount to a building surface and is operable to produce both static and animated large-scale color light displays. The EBMD is broadly comprised of a plurality of light fixtures configured to be individually mounted, either directly or via a mounting assembly, to the building surface. Therefore, the light fixtures are not mounted to a uniform support, such as a screen, that is then mounted to the building surface. Additionally, the light fixtures are not linked or interconnected via a common support, such as the screen, or any other type of unitary or semi-unitary system that interconnects the plurality of light fixtures.

The method of the present invention broadly comprises the steps of (a) selecting a building surface on which to locate the display; (b) selecting at least one graphical image to be displayed, such as an animated picture or scrolling text; (c) selecting a type of light fixture to mount to the surface; (d) determining a plurality of locations on the surface where a plurality of light fixtures can be mounted; (e) selecting from the plurality of locations where the light fixtures can be mounted a plurality of optimal locations at which to mount the light fixtures for producing the selected image; (f) mounting the light fixtures to the surface; (g) assigning lighting characteristics to each light fixture; and (h) determining an angular orientation of each light fixture for optimal viewing of the image from a pre-determined vantage point.

The EBMD of the present invention may be mounted on almost any building surface, including indoor and outdoor building surfaces. The building surface may include multiple irregularities, such as windows, air vents, pipes, columns, etc. that interfere with the generally uniform substrate, such as brick or concrete, of the building surface. The present invention provides a method of determining where a plurality of light fixtures may be mounted on the building surface without interfering with the irregularities, yet still constructing a display with sufficient resolution and pixel pitch to produce a visually uniform image.

Many factors may be considered in selecting the image displayed, including subjective preferences, such as a holiday or a season, a location of the building, or a type of the building. Additionally, selection of the image should also be dependent on the size of the building surface and a desired resolution of the image, which may then be dependent on a distance from which the image will be viewed and a maximum cost for the EBMD.

The type of light fixture selected may be dependent on several factors, including an environment of the building, i.e., whether the building surface is inside or outside, the distance from which the display is to be viewed, and a desired angle of illumination of the light fixture. For most applications, the light fixtures used in the present invention preferably include light emitting diodes ("LEDs") as the light producing element.

The present invention individually mounts the light fixtures to the building surface either directly or via the mounting assembly. Therefore, because the light fixtures are mounted individually, they can be mounted in almost any location on the building surface that does not interfere with the aesthetic or functional qualities of the irregularities. However, not all locations on the building surface are optimal for mounting the light fixtures. Therefore, after determining where the light fixtures can be mounted, it must then be determined where the light fixtures may optimally be mounted.

Several factors are considered in determining where the light fixtures may optimally be mounted, including whether the building surface includes any existing structure that would facilitate mounting of the light fixtures and thus decrease the overall cost of the EBMD, and what location for the light fixtures will produce a proportional and balanced array.

After determining where to mount the light fixtures, the light fixtures are then mounted to the building surface. Any known mounting assembly may be used, and mounting assemblies may be specially configured for mounting to the irregularities on certain building surfaces. Once mounted to the surface, the light fixtures are controlled by a plurality of DMX controllers and corresponding power/data supplies. The DMX controllers are in communication with and controlled by a central processor.

After the light fixtures are mounted to the surface, the selected image is designed using a bit map grid, which illustrates the location of each light fixture as a pixel. Based on the location of the light fixture in the grid, the light fixture is assigned lighting characteristics, such as color, intensity, and animation characteristics.

The final step in creating the EBMD is selecting and setting the angular orientation of each light fixture. The light fixture is preferably operable to rotate about two axes to orient the light fixture in a desired direction. Due to the size of the EBMD, it is common that not all light fixtures will be oriented in the same direction, especially on outside building surfaces. Additionally, some light fixtures on the EBMD may need to be oriented so as to not obstruct or interfere with irregularities on the building surface, such as light shining into a window. Further, the light fixtures' orientation may be dependent on preferred vantage points from which the EBMD will be viewed.

The EBMD of the present invention also incorporates intelligent light fixtures that each include a microprocessor and a memory. This advantageously reduces the number of required wires or cables necessary to control the EBMD, thus reducing the cost of mounting the display to a surface, reducing the physical limitations of having multiple wires interconnecting the light fixtures to an intelligence source, and increasing the aesthetic features of the EBMD.

The EBMD and method of creating such as described herein has numerous advantages. For example, the EBMD may be mounted to the building surface without use of a screen or other common support on which the light fixtures must first be mounted. Thus, the light fixtures need not be linked or interconnected together via the common support. Additionally, the light fixtures of the EBMD may be irregularly spaced, such that a distance between the light fixtures is varied among the EBMD. Therefore, the locations at which the light fixtures can be mounted without interfering with the irregularities of the building surface is increased. Further, the light fixtures need not be placed end-to-end or side-by-side in order to produce a visually uniform image. Further yet, the present invention provides a cost-effective system for mounting a large-scale display on a building surface.

These and other important aspects of the present invention are described more fully in the detailed description below.

BRIEF DESCRIPTION OF THE DRAWING FIGURES

First and second preferred embodiments of the present invention are described in detail below with reference to the attached drawing figures, wherein.

Figure 8:
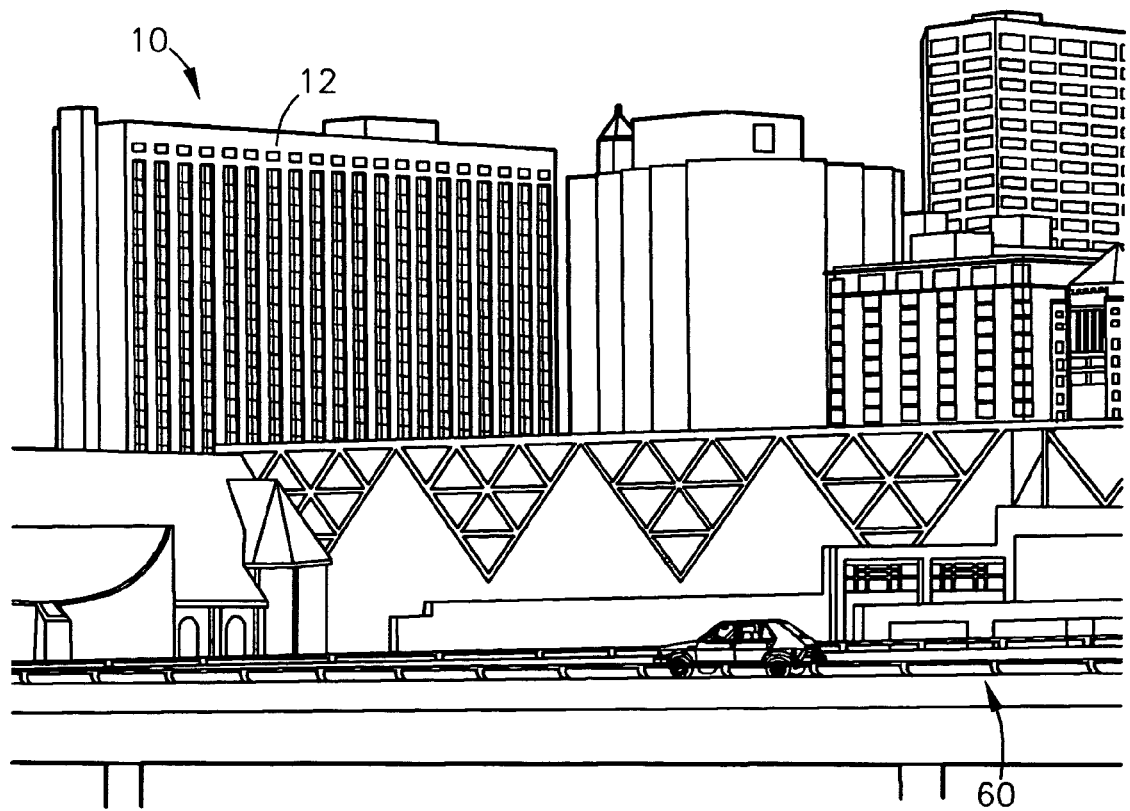
Figure 9:
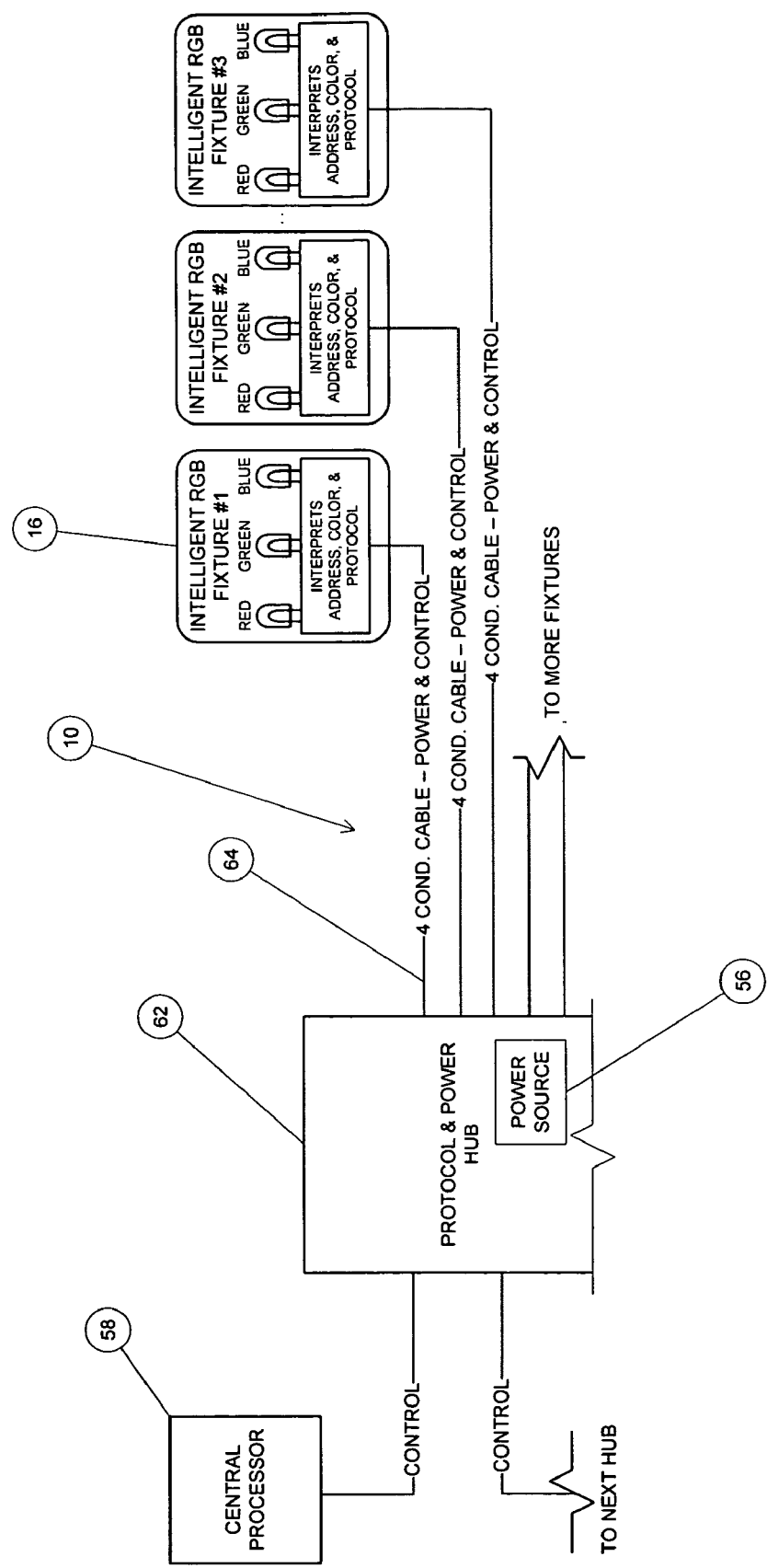
Figure 10:
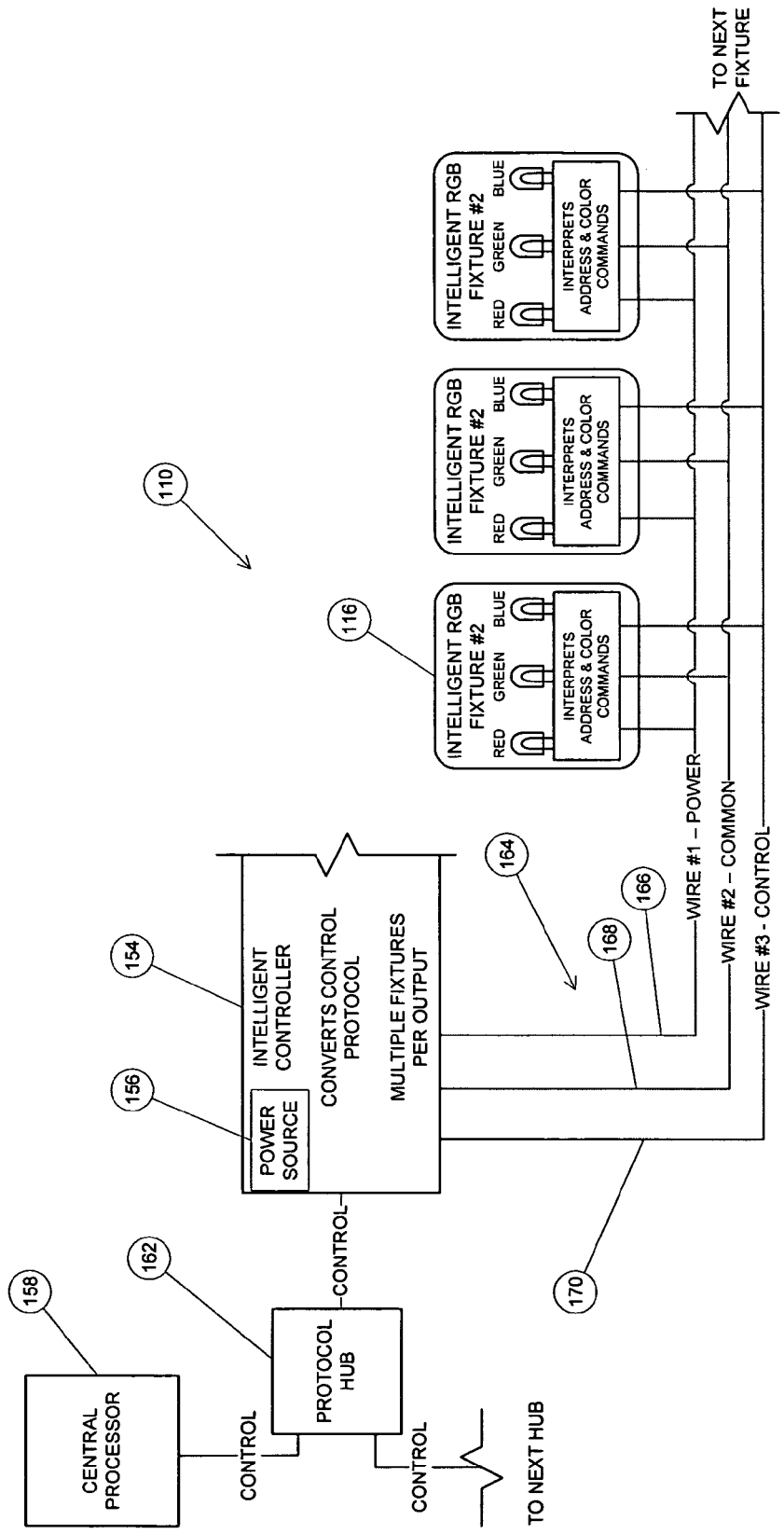

FIG. 8 is an environmental view of the EBMD mounted on the building surface and viewed from a vantage point; and FIG. 9 is a schematic diagram illustrating a plurality of intelligent light fixtures of the first preferred embodiment and their connection to a protocol and power hub and a central processor; and FIG. 10 is a schematic diagram illustrating a plurality of intelligent light fixtures of the second preferred embodiment and their connection to an intelligent controller, a power hub, and a central processor.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 1:
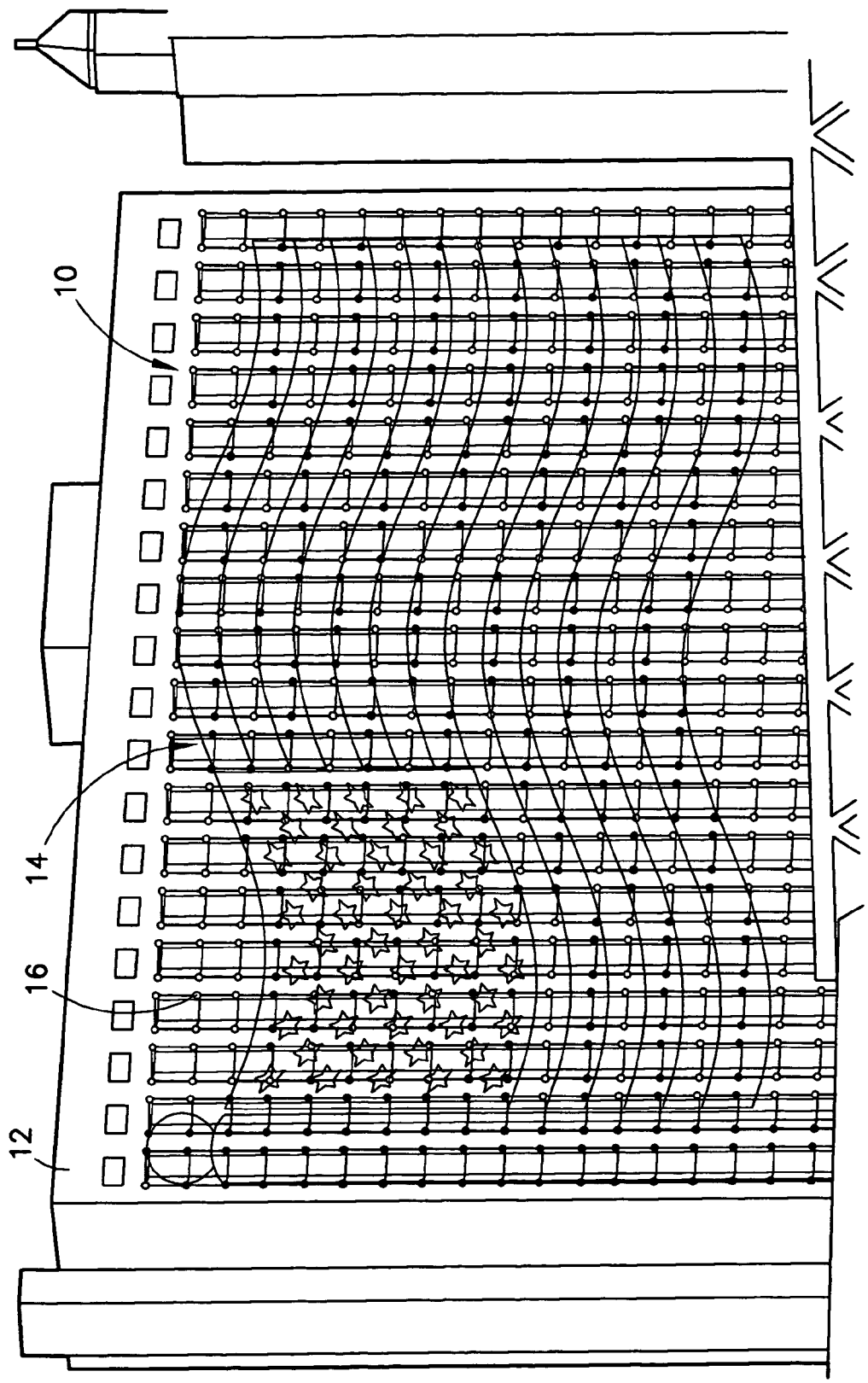
FIG. 1 is an isometric view of an expanded bit map display ("EBMD") of the first preferred embodiment of the present invention mounted on a building surface and displaying an image.
Figure 2:
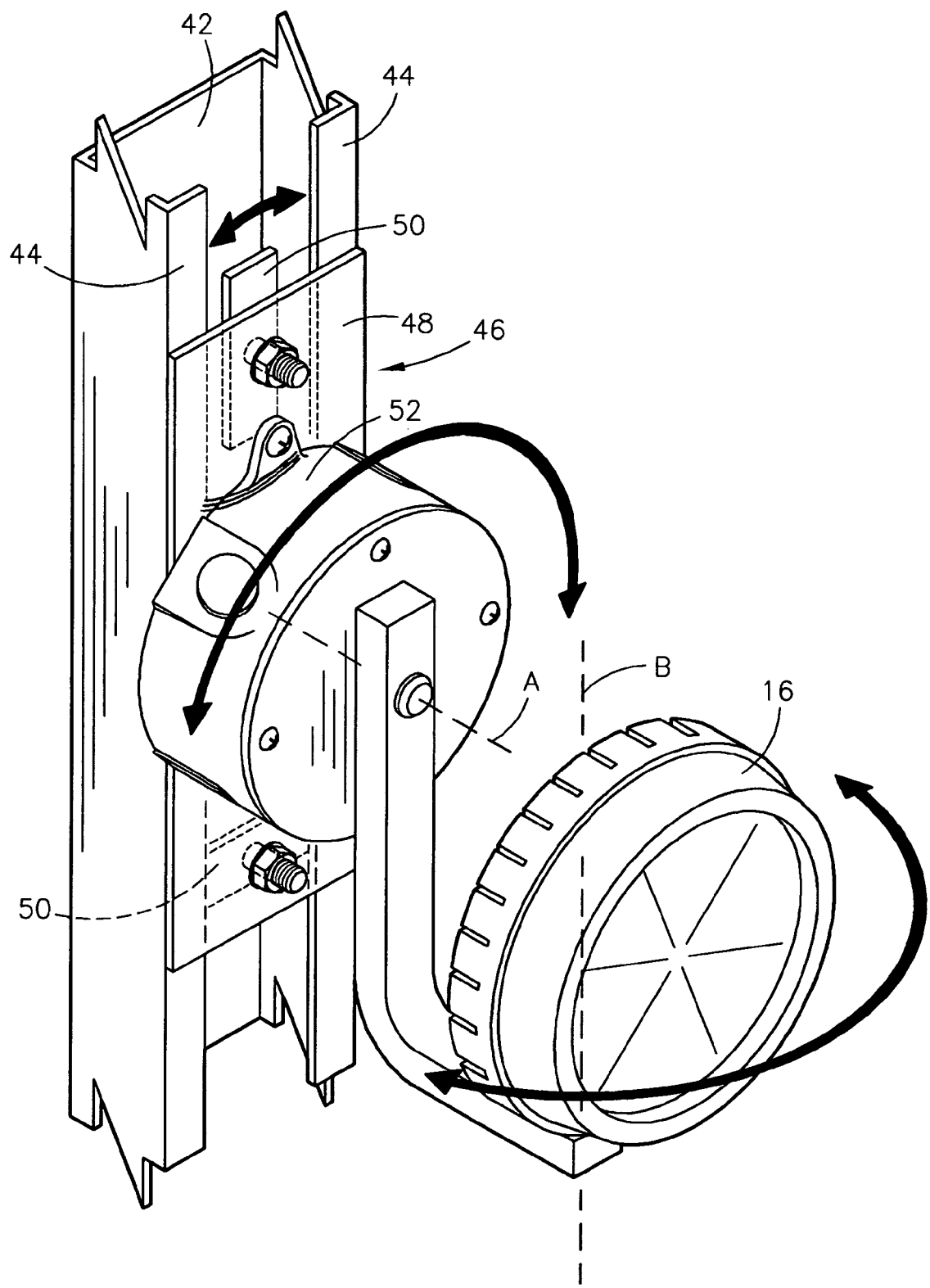
FIG. 2 is an isometric view of a light fixture and mounting assembly of the EBMD, particularly illustrating two axes of rotation of the light fixture.
Figure 3:
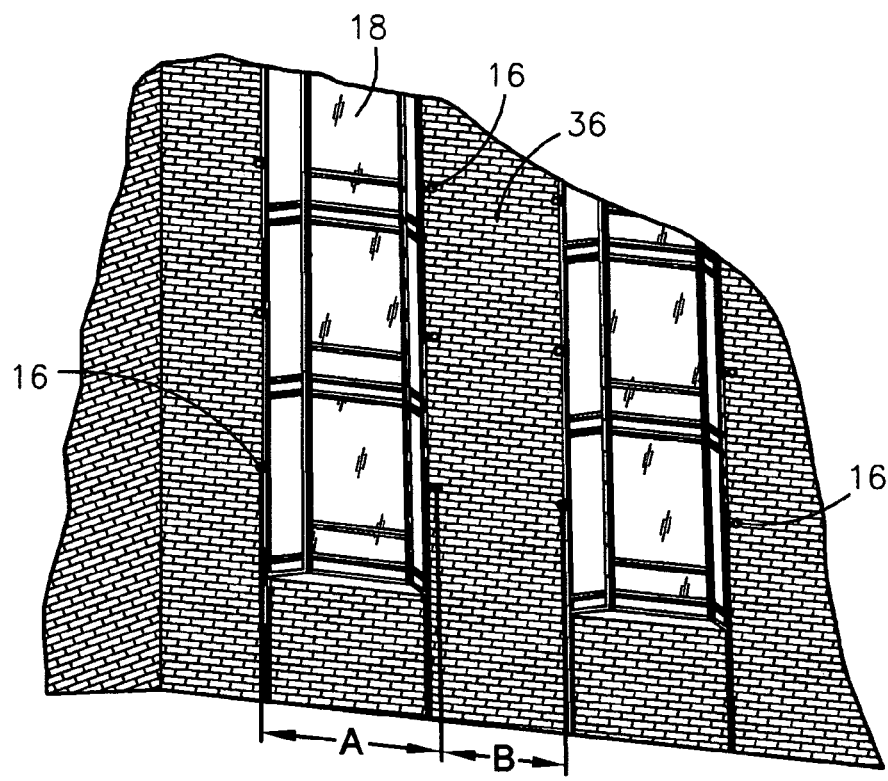
FIG. 3 is a fragmentary isometric view of the building surface on which the EBMD is mounted, particularly illustrating a plurality of irregularities and a spacing of the light fixtures on the building surface.

Turning now to the drawing figures, and particularly FIGS. 1-3, an expanded bit map display ("EBMD") 10 and a method of creating such for mounting on a building surface 12 is shown. The EBMD or "display" 10 is a graphical image 14 of an animated picture, a scrolling text, or other light-driven show or a video or computer graphic image. The display 10 comprises a plurality of arranged light fixtures 16 each representing a pixel. The light fixtures 16 are individually mounted to, secured to, or otherwise coupled with the building surface 12, such as an outside face or an internal wall of a building. The light fixtures 16 may then be instructed to display the graphical image 14, as discussed in more detail below. The invention is particularly adapted for placement of the EBMD 10 on irregular surfaces, wherein the surface provides or has associated with it a plurality of obstructions, protrusions, or other irregularities 18, such as windows, columns, lettering, air vents or grates, pipes, and/or other structural and architectural features.

A bit map is commonly referred to in the art as a graphical display comprising a plurality of rows and columns formed from a plurality of dots. On a color computer monitor, for example, three dots illuminating red, blue, and green converge to form a pixel. A graphical image displayed on the color computer monitor is then formed from a plurality of rows and columns of pixels, whereby the pixels are selectively lit to produce the image. The multiple pixels are preferably spaced a distance apart, known in the art as pixel pitch, such that when viewing the graphical image on the computer monitor, the spaces between the pixels cannot be seen by the naked human eye. As can be appreciated, the more pixels positioned within a particular graphical area, the higher a resolution of the graphical image. The number of pixels positioned within the graphical area is referred to in the art as a density of the display.

Figure 4:
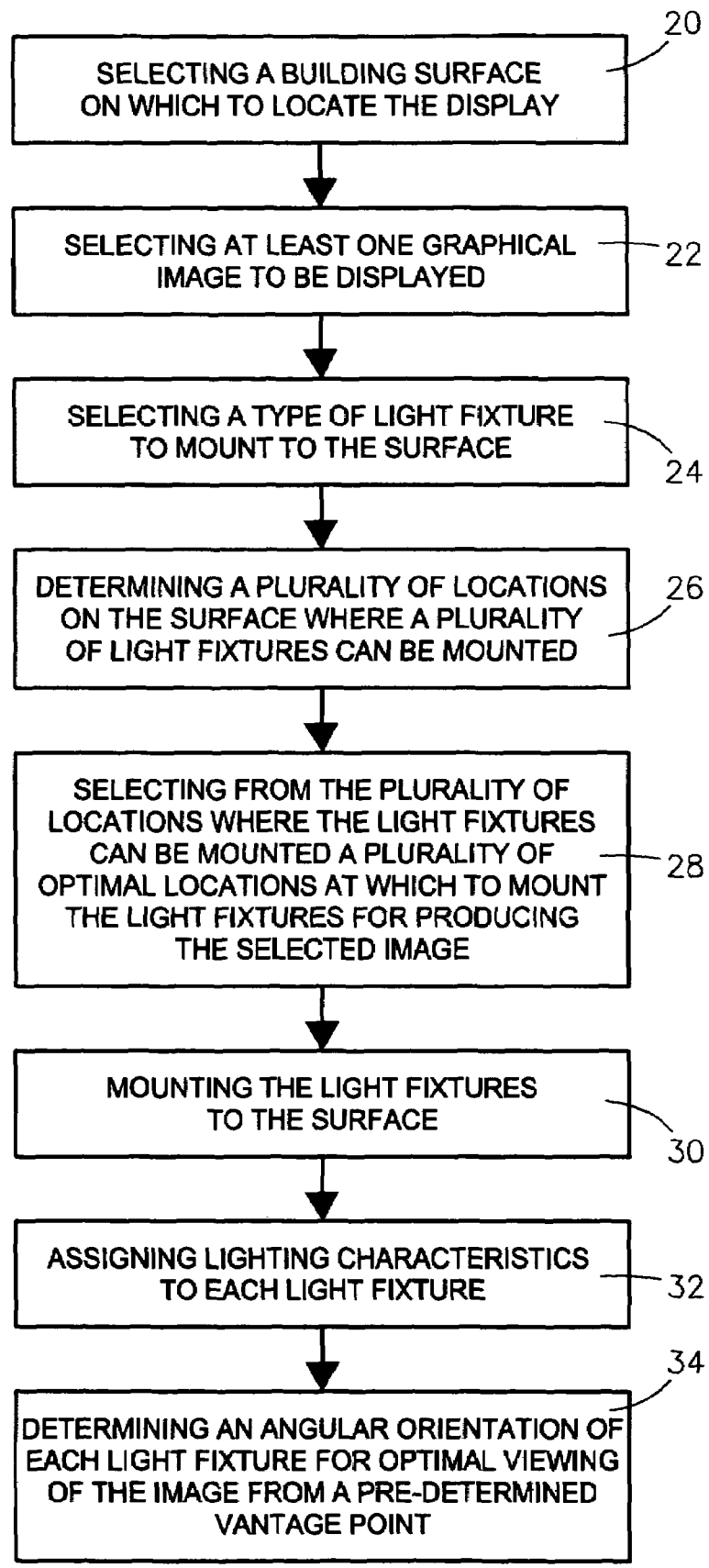
FIG. 4 is a flow chart of a plurality of steps performed for creating the EBMD.

The present invention applies the above concepts to large-scale graphical displays on irregular surfaces, such as the outside face of the building, by providing the method of creating the EBMD 10 broadly comprising the steps of (a) selecting a building surface on which to locate the display, referenced at step 20 in FIG. 4; (b) selecting at least one graphical image to be displayed, such as an animated picture or scrolling text, referenced at step 22; (c) selecting a type of light fixture 16 to mount to the surface, referenced at step 24; (d) determining a plurality of locations on the surface where the light fixtures 16 can be mounted, referenced at step 26; (e) selecting from the plurality of locations where the light fixtures 16 can be mounted a plurality of optimal locations at which to mount the light fixtures 16 for producing the selected image, referenced at step 28; (f) mounting the light fixtures 16 to the surface, referenced at step 30; (g) assigning lighting characteristics to each light fixture 16, referenced at step 32; and (h) determining an angular orientation of each light fixture 16 for optimal viewing of the image from a pre-determined vantage point, referenced at step 34.

The flow chart of FIG. 4 shows the functionality and operation of a preferred implementation of the present invention in more detail. In this regard, some of the blocks of the flow chart may occur out of the order depicted in FIG. 4. For example, two blocks shown in succession in FIG. 4 may in fact be executed substantially concurrently, or the blocks may sometimes be executed in the reverse order depending upon the functionality involved.

As illustrated in FIG. 3, the present invention provides the advantage of mounting the EBMD 10 on almost any building surface 12, such as the outside or inside surface of the building. For example, the outside surface of the building may include windows, lettering, such as may be used to identify a name of the building or a business housed within the building, air vents, grates, pipes, columns, and numerous other architectural and structural features. These features are generally associated with a substrate 36 of the building surface 12 and may be coupled to, secured to, or otherwise interspersed throughout the substrate 36. As such, the features all share the characteristic that they are common to the substrate 36, i.e., that they are associated with the substrate 36. The substrate 36 of the outside surface may be, for example, stone, brick, cement, or other suitable structural materials. The substrate 36 and the above features associated with the substrate 36 form the building surface 12.

The above features also share the characteristic that they interfere with the continuity and uniformity of the substrate 36. Therefore, the features are all irregular with respect to the substrate 36 and thus, must be accounted for in determining where the light fixtures 16 of the display 10 can be located, as discussed in detail below. The features that are associated with the substrate 36 will hereafter be referred to as "irregularities" 18.

Irregularities 18 associated with the substrate 36 are also found on inside surfaces of the building. For example, the inside surface may include features such as windows, air vents or grates, molding, or other structural or architectural elements that jut out from the surface or interfere with the generally uniform substrate 36. For the inside surface, the substrate 36 may be sheet rock, cement, brick, or other suitable structural materials. As with the outside surface, the features interfering with the inside surface's substrate 36 are irregularities 18 that must be accounted for in determining where the light fixtures 16 can be located.

After selecting the building surface 12 on which to locate the display 10, referenced at step 20, the at least one graphical image 14 to be viewed on the display 10 is selected, referenced at step 22. The EBMD 10 is operable to display at least one graphical image 14 and preferably several graphical images. The image 14 may be, for example, static, animated, scrolling, panned, or may include features such as flicker, shimmer, sparkle, and fade. The image 14 may be text, patterns of colors, or a picture, such as a flag, as illustrated in FIG. 1. Preferably, when more than one image 14 is selected, the selected images 14 are displayed on the EBMD 10 as a sequence, such that each image 14 is presented for approximately three to twenty seconds, although such a range is not intended as limiting. Hereafter, the term "image" is defined as a single, static image or a sequence of images.

Additionally, the image 14 may be video driven, including analog video, such as NTSC, or digital video. Therefore, the EBMD 10 is operable to display not only images comprising swaths of color that are static or animated, but the EBMD 10 can also display both analog and digital video.

The image 14 to be displayed may be selected based on several subjective preferences, such as a season or a holiday during which the image 14 is to be displayed, a location of the building on which the display 10 is to be provided, a type of building, such as government or private, etc. Additional factors that should also be considered in selecting the image 14 include the size of the surface on which the display 10 is to be mounted and a desired resolution for viewing of the image 14, as described below.

The EBMD 10 of the present invention provides for a large-scale display. For example, on the outside surface of the building, the display 10 may be several tens of feet, and perhaps even hundreds of feet, long and wide. Therefore, the image 14 displayed is intended to be viewed from a large distance, such as several hundred feet to several miles away. Selection of the image 14 will be partially dictated by the area of the building surface 12, and thus, the general length and width of the area must be considered in determining what types of images 14 are appropriate for viewing on the display 10. For example, if the surface's width is much smaller as compared to the surface's height, then text or a flag as the selected image 14 may not produce a realistically scaled image. In contrast, if the surface's height is much larger than the surface's width, then elongated images, such as a Christmas tree, may be more suitable.

Additionally, in selecting the image 14 to be displayed, the desired resolution of the image 14 must be considered, which may be dependent on such factors as a distance from which the image 14 is to be viewed and a maximum cost for creating the EBMD 10. For example, if the building surface 12 on which the image 14 is displayed is the inside surface, the image 14 will likely not be viewed from as great a distance as if the building surface 12 were the outside surface. Therefore, for the inside surface, a density ratio may be greater than for the outside surface. The density ratio is the number of light fixtures 16 per a particular area, such as a square foot. On the inside surface, the density ratio may be, for example, four light fixtures 16 per square foot, whereas on the outside surface, the density ratio may be only one light fixture per square foot. This is because the density of the light fixtures 16 will, of course, affect the resolution of the image 14. Therefore, for an image viewed from a greater distance, such as for the image 14 displayed on the outside surface, less resolution may be required than for an image viewed from a shorter distance, such as for the image 14 displayed on the inside surface.

Because of the large-scale of the image 14 selected, hundreds, and perhaps even thousands, of light fixtures 16 may be required. Therefore, in determining the desired resolution for the image 14 to be displayed, a cost of the light fixtures 16 and a cost for mounting the light fixtures 16 to the surface 12 must be considered. As can be appreciated, if an entity desiring to have the EBMD 10 located on its building specifies a maximum cost of the EBMD 10, the number of light fixtures 16 that can be used in the display 10 is greatly affected. Therefore, when determining the desired resolution of the image 14, the costs associated with the number of light fixtures 16 necessary to produce the desire resolution must be considered.

It is noted that the selection of the image 14 may also occur after step 28 of mounting the light fixtures 16 to the surface. For example, it may be that the light fixtures 16 are mounted to the surface and then the image 14 is selected. Alternatively, the selection of the image 14 referenced at step 28 may occur at any time during performance of the method of the present invention.

After selecting the image 14 to be displayed, referenced at step 22, the type of light fixture 16 to be mounted on the building surface 12 is determined, referenced at step 24. The type of light fixture 16 may be dependent on several factors, including the environment of the building surface 12, i.e., inside surface or outside surface, the distance from which the display 10 is to be viewed, and a desired angle of illumination of the light fixture 16, referenced at numeral 38 in FIG. 5. With respect to the environment of use of the display 10, if the building surface 12 is the outside surface, then a light fixture that can withstand rain, temperature changes, wind, etc. is preferably selected. The selected light fixture 16 is also preferably dependent on the distance from which the image 14 is to be viewed. For example, if the surface 12 is the inside surface, then light fixtures 16 producing relatively less intense light that is not as bright and that does not emanate as far as light fixtures for outside surfaces is preferable. The preferred light fixture 16 for the present invention is sold by Color Kinetics of Boston, Mass. under the trademark "COLORBURST 4."

It is to be understood that reference to the "light fixture" 16 throughout this specification is also deemed reference to any light producing element. Further, in some instances, the term "pixel" is used to represent the a single point in the image 14, and thus, the light fixture 16 may correspond to a pixel.

The angle of illumination 38 of the light fixture 16 is also an important consideration. For example, light fixtures 16 having incandescent bulbs "spill" light in all directions, producing more of a general glow about the bulb. In contrast, light fixtures 16 having light emitting diodes ("LEDs") project light along a certain pre-defined path. Therefore, LEDs are preferably used that have an angle of illumination 38, i.e., the angle through which light emanates from the LED, defined throughout a certain desired angle.

For the EBMD 10 of the present invention, use of the light fixture 16 having LEDs is preferable for several reasons. First, the angle of illumination 38 can be controlled, as described in more detail below. Second, the illumination life of the LED is much greater than for an incandescent bulb. Third, the LEDs are commonly more durable than incandescent bulbs and not as prone to breakage. Although light fixtures 16 having LEDs are preferable for the present invention, light fixtures 16 having incandescent bulbs or other types of light producing elements may also be used. However, light fixtures 16 using LEDs will hereafter be described, although such description is not intended to be limiting to light fixtures 16 using LEDs.

After selecting the type of light fixture 16 to be mounted to the surface 12, referenced at step 24, a plurality of locations on the surface 12 at which the light fixtures 16 can be mounted must be determined, referenced at step 26. Because the surface 12 includes the substrate 36 and interspersed irregularities 18, as described above, determining where the light fixtures 16 can be located must include the step of accounting for the existing irregularities 18 associated with the surface 12. Because the light fixtures 16 are individually mounted to the building surface 12, either directly or via a mounting assembly, as discussed below, mounting of each light fixture 16 does not require much surface area. Thus, the light fixtures 16 can be mounted around irregularities 18 as needed and without interfering with the aesthetic or functional qualities of the irregularities 18.

As described above, the irregularities 18 may be of many forms or types, including windows, columns, air vents, etc., as illustrated in FIG. 3. Some irregularities 18 may be uniformly distributed throughout the substrate 36 of the surface 12, such as windows, and other irregularities 18 may occur within particular regions of the substrate 36, such as air vents. Additionally, some structural or architectural elements of the surface 12 may be more amenable to having light fixtures 16 mounted thereon. For example, light fixtures 16 are preferably not mounted on windows for several reasons. First, the light emanating from the light fixture 16 may interfere with persons on an opposing side of the window. For example, if the light fixture 16 is mounted on a window of the outside surface, the light emanating from the light fixture 16 may interfere with the person inside the building. Second, the mounted light fixture 16 on the window may not be aesthetically pleasing or may interfere with a view outside the window. For example, if the light fixture 16 is mounted on a window on the inside or outside surface of the building, the light fixture 16 will obstruct the view of the person inside the building.

Because the irregularities 18 must be considered in mounting the light fixtures 16, a size and location of those irregularities 18 that are generally uniformly interspersed throughout the substrate 36, such as windows, are first considered. As with any bit map, the pixels or light fixtures 16 are spaced a distance apart. With prior art bit maps, such as displayed on the computer monitor or the large-screen "JUMBOTRON," the pixels are often spaced generally uniformly such that the distance separating the pixels is substantially 1:1. For example, in a 1:1 ratio, a horizontal distance between each pixel is approximately the same distance as a vertical distance between each pixel. Such uniformity is desired so as to produce an image that is sufficiently visually blended that the distance separating the pixels does not interfere with the viewing of the image as a whole.

The EBMD 10 of the present invention, however, can produce visually blended images 14 using uneven distance separation between pixels, such that the pixels in the display 10 do not need to be spaced 1:1. This then allows for the light fixtures 16 representing the pixels to be spaced unevenly on the building surface 12. Due to the large-scale size of the EBMD 10, the uneven pixel arrangement still produces an image that is visually uniform.

In more detail, the distance separating pixels may be two or more times greater than a width of the pixel itself. For example, the distance between two pixels positioned next to each other may be at least two times greater than the pixel's width. For the preferred embodiment of the present invention, the pixel separation distance is approximately seventeen times greater than the width of the pixel. However, Applicants have determined that a pixel separation distance of at least two times to at least fifty times greater than the pixel width is possible, with a pixel separation distance of at least ten times to at least thirty times the pixel width preferred.

As can be appreciated, the pixel separation distance is dependent on the type of light fixture 16 used, the desired resolution, the size of the EBMD 10, the distance from which the EBMD 10 is to be viewed, and the desired image 14 to be produced. For example, larger-sized EBMDs 10 can display visually blended images with larger pixel separation distance. Additionally, if images 14 are to be displayed that do not require tight, densely packed pixels, then large pixel separation distance may be used. For example, if the image 14 is more of an effect, such as waves of color, than a distinct picture, such as a Christmas tree, then large pixel separation distance may be used. Irrespective of the size of the EBMD 10, It is preferred that the pixel separation distance is such that the display 10 appears contiguous or visually blended.

An angle of illumination of the light fixture 16 is also important in determining the appropriate and minimum pixel separation distance. For example, light fixtures 16 having a larger angle of illumination spread light throughout a greater angle, thus requiring fewer pixels be positioned within a selected area.

As can be appreciated, the irregularities 18 on the building surface 12 may not always provide for uniform spacing of the light fixtures 16 or pixels. For example, in FIG. 3, windows having a horizontal width A are separated throughout the substrate 36 by a horizontal distance B, where the distance A is greater than the horizontal distance B. Light fixtures 16 positioned at opposite sides of each window are then separated by alternating horizontal distances A and B, providing uneven pixel separation. However, even given the uneven pixel separation, the image 14 produced on the display 10 is visually uniform.

Figure 6:
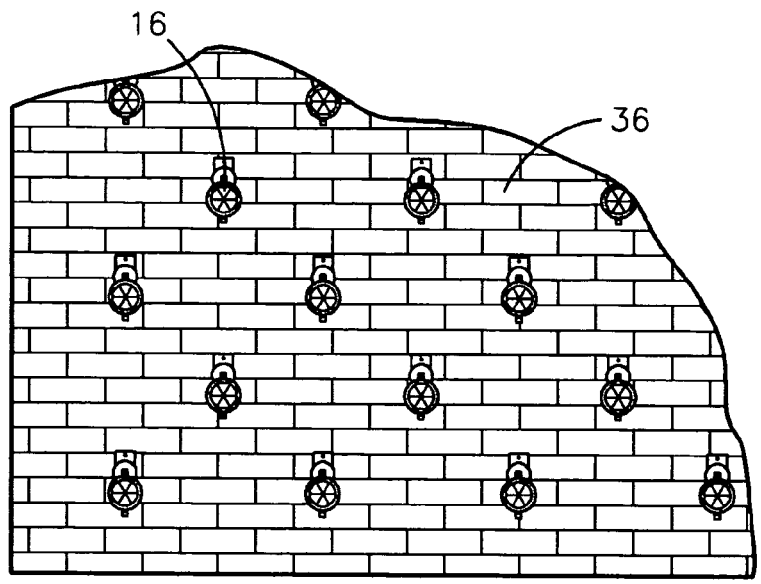
FIG. 6 is a fragmentary front view of the building surface, particularly illustrating the light fixtures mounted on the building surface in an offset configuration.

In addition to uniformly distributed irregularities 18, irregularities 18 that are located in only one area of the surface 12 or that are randomly interspersed throughout the substrate 36 must also be considered. For example, if the irregularity 18 is the air vent, it must first be determined if the light fixture 16 can be mounted on the air vent. If it cannot, then it must be determined where around the air vent the light fixture 16 can be mounted. If there is a particular area of the surface 12 that is not conducive to having light fixtures 16 mounted thereon, then the image 14 must be selected accordingly. For most buildings, however, there will be at least some portion of the surface 12 on which the light fixtures 16 may be mounted that will not interfere with the selected image 14. This is primarily because the light fixtures 16 need not be uniformly spaced on the surface 12. The light fixtures 16 may be spaced off-set from each other, as illustrated in FIG. 6, such that rows and columns of light fixtures 16 are not arranged side-by-side.

Alternatively, the light fixtures 16 may even be spaced randomly, so long as the desired resolution for the image 14 is obtained.

Not all locations on the surface 12 that are amenable to having light fixtures 16 mounted thereon are optimal for viewing of the selected image 14. For example, surrounding irregularities 18 jutting out from the building surface 12 may block the light emanating from the light fixtures 16. Alternatively, some locations where light fixtures 16 can be mounted may be outside the desired area for displaying the selected image 14.

Often, there will be numerous locations on the building surface 12 on which the light fixtures 16 can be mounted. Selection of where to optimally locate the light fixtures 16, referenced at step 28, will then be primarily dependent on (1) whether the building surface 12 includes any existing structure that supports and facilitates mounting of the light fixtures 16; and (2) what locations for the light fixtures 16 will produce a proportional and balanced array.

Figure 5:
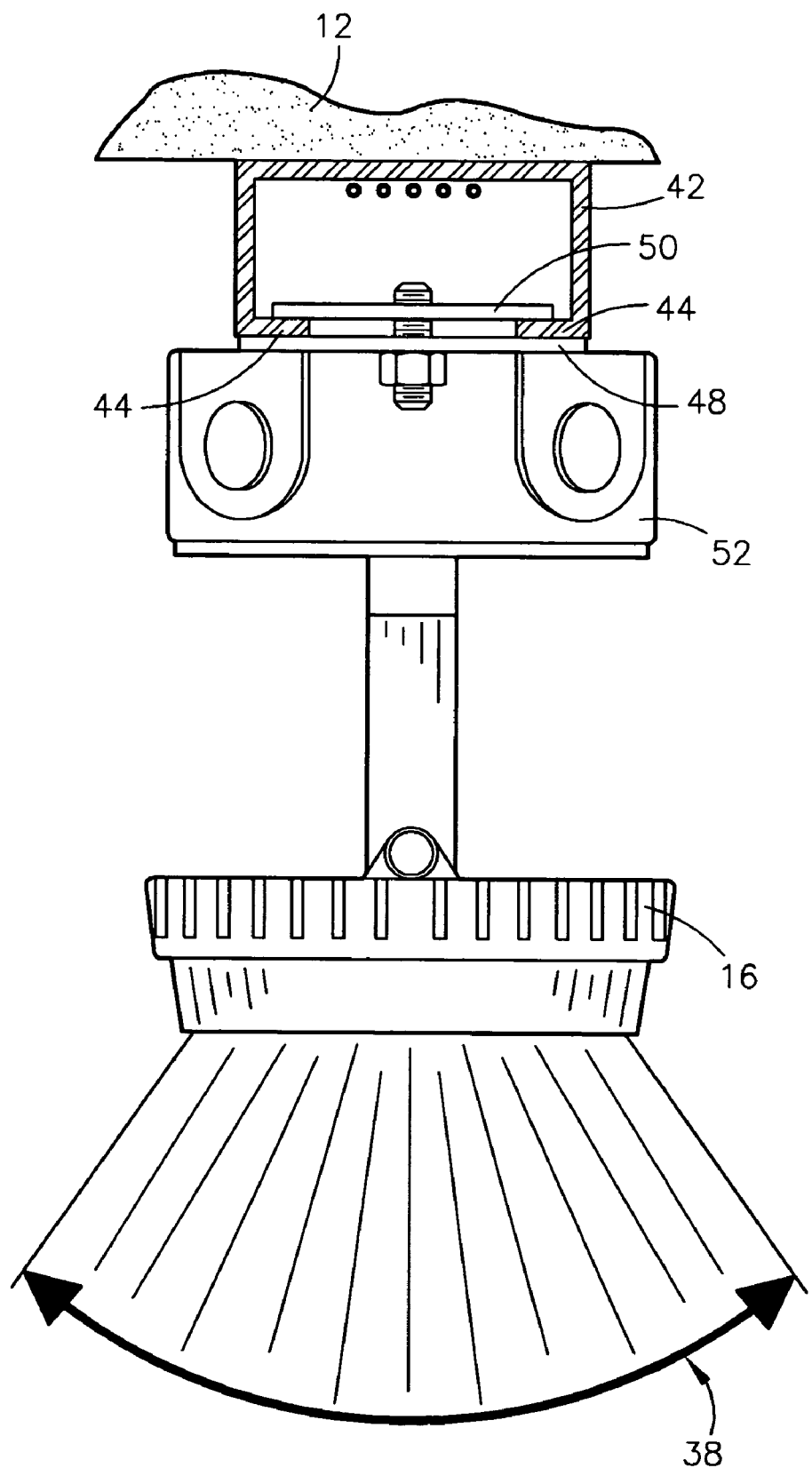
FIG. 5 is a plan view of the light fixture mounted on the building surface, particularly illustrating a track on the building surface in horizontal cross-section and an angle of illumination of the light fixture.

Existing structure on the building surface 12 may facilitate mounting of the light fixtures 16 and thus decrease the overall cost necessary for creating the EBMD 10. For example, in FIGS. 2 and 3, tracks 42 are positioned on opposing sides of the window 18 and run vertically along the substrate 36. The tracks 42 are generally U-shaped and include a pair of opposing flanges 44. Because the tracks 42 are particular to the building surface 12 illustrated in FIG. 3, a mounting assembly 46 must be configured to couple with the tracks 42 and to mount the light fixtures 16 to the building surface 12. The mounting assembly 46 includes a plate 48, a pair of rotatable securing bars 50, and a junction box 52, as illustrated in FIGS. 2 and 5. The light fixture 16 is secured to the junction box 52 via screws or other suitable fasteners, and the junction box 52 is secured to the plate 48 via screws or other suitable fasteners. The rotatable securing bars 50 are secured to opposite ends of the plate 48. The plate 48 is sized to be positioned generally adjacent to the flanges 44 of the tracks 42. Once the plate 48 is positioned against the flanges 44, the rotatable securing bars 50 can be rotated generally horizontally to secure the plate 48 to the track 42, as illustrated in FIGS. 2 and 5.

Other mounting assemblies may be designed to couple with the particular existing structures of building surfaces 12, and different mounting assemblies on the same EBMD 10 may even be needed. Therefore, when determining where the light fixtures 16 may optimally be located on the building surface 12, existing structure, such as the above-described tracks 42, should be considered. However, as can be appreciated, not all building surfaces 12 will have existing structure that facilitates mounting of the light fixtures 16, and such existing structure is not required for mounting the light fixtures 16 to the building surface 12. For example, the present invention provides that a mounting assembly for mounting the light fixtures 16 can be secured directly to the building surface 12, or alternatively, the light fixtures 16 may be directly mounted to the building surface 12.

If the building surface 12 includes existing structure supporting and facilitating mounting of the light fixtures 16, using such structure may decrease the overall cost of the EBMD 10. For example, the existing structure may require fewer mounting assemblies, or the mounting assemblies used with the existing structure may be less cumbersome, include fewer parts, and be less expensive to manufacture. Additionally, using existing structure for mounting the light fixtures 16 may reduce any damage to the building surface 12, and preferably, mounting of the light fixtures 16 does not damage the building surface 12.

A further consideration for selecting where the light fixtures 16 may optimally be mounted on the surface 12 includes determining the pixel pitch of the light fixtures 16. Recall that the pixel pitch is the distance or separation between pixels or light fixtures 16. Although the distance between the light fixtures 16 of the present invention need not be 1:1 or even 2:1 or 3:1, a generally balanced and evenly proportioned array for the light fixtures 16 is optimal. As such, because of the size of the display 10, even an array of light fixtures 16 that is irregularly-spaced will produce a suitably optimal image 14, as long as the array is generally balanced and proportional. To be balanced and proportional, it is preferable that the density of the light fixtures 16 within equally-sized regions be approximately the same. For example, for every twenty square feet of surface area, it may be desired to have ten light fixtures 16. Therefore, when viewing the area of the building surface 12 for mounting of the display 10, it is preferable that approximately ten light fixtures 16 are mounted on every twenty square feet of building surface 12. However, the present invention allows for the light fixtures 16 to be unevenly spaced when necessary while still producing the visually uniform image 14.

Additionally, it is preferable that a minimum and a maximum pixel pitch among the light fixtures 16 is determined. The visual uniformity of the image 14 may be affected if the pixel pitch is either too small or too large. Therefore, when determining where to optimally locate the light fixtures, any minimum and maximum pixel pitches should be considered.

An even further consideration on where light fixtures 16 may optimally be mounted on the inside surface includes consideration of ambient light within the building from other light sources interfering with the light emanating from the EBMD 10. Because the ambient light may affect the overall viewing of the EBMD 10, selection of the optimal locations for placement of the light fixtures 16 should account for any inside lighting.

After selecting the plurality of locations at which to mount the light fixtures 16, referenced at step 28, the light fixtures 16 are mounted to the building surface 12, referenced at step 30. The light fixtures 16 are preferably individually mounted to the building surface 12, such that the light fixtures 16 are not linked or otherwise interconnected via a common support, such as a thin screen or any other type of unitary or semi-unitary system that interconnects the light fixtures 16.

Figure 7:
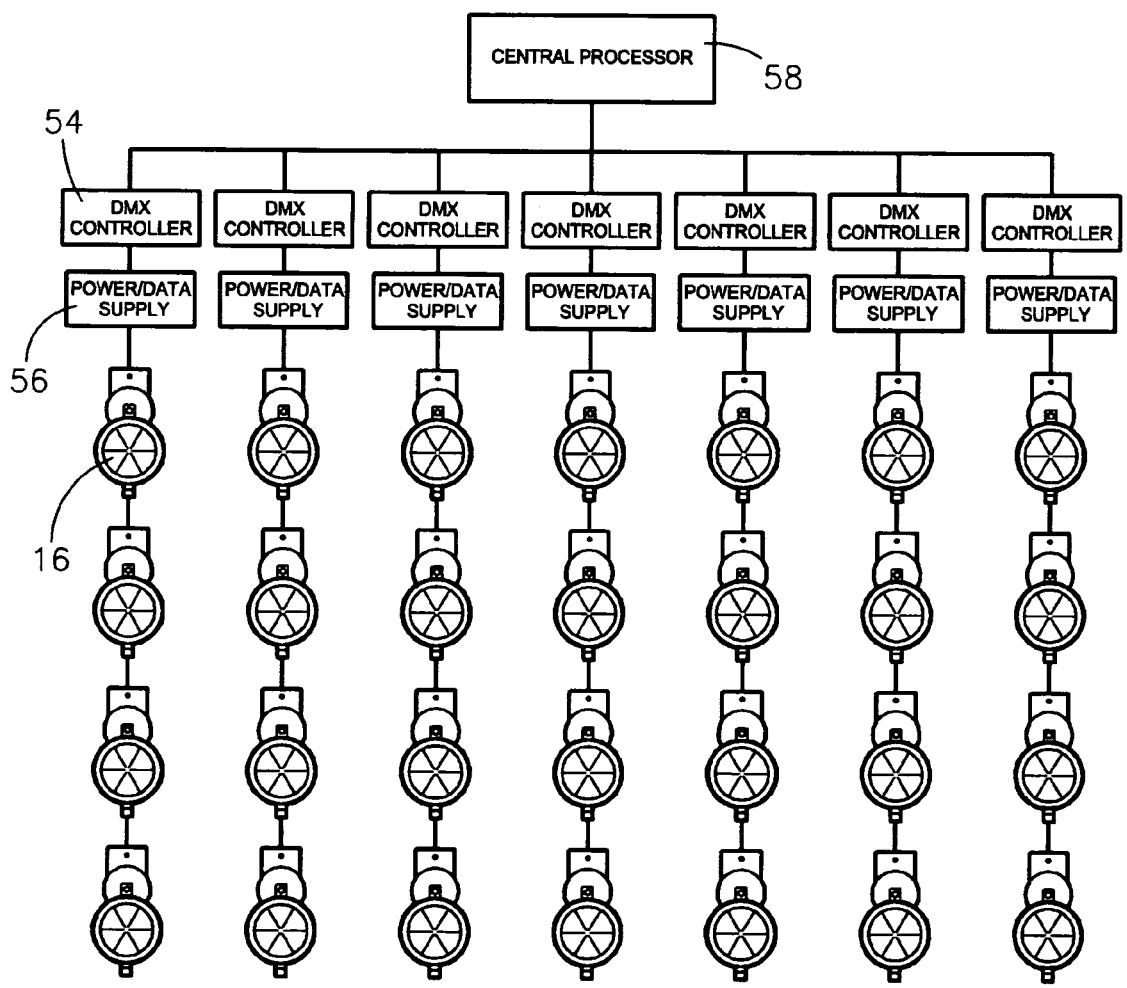
FIG. 7 is a schematic diagram of the components of the EBMD.

The light fixtures 16 may be mounted in any suitable manner and using any suitable mounting assembly, such as the mounting assembly 46 in FIGS. 2 and 5. As described above, the mounting assembly 46 may be configured to couple with the existing structure of the building surface 12, or alternatively, the light fixture 16 may be directly mounted to the surface 12. Once mounted to the surface 12, the light fixtures 16 are preferably electrically connected via a plurality of DMX controllers 54 and corresponding power/data supplies 56, as illustrated in FIG. 7 and as discussed in more detail below. Intelligent light controllers other than DMX controllers may also be used. Preferable power/data supplies 56 are sold by Color Kinetics of Boston, Mass., model number PDS-150e.

Each individual DMX controller 54 is connected to and controls the individual power/data supply 56, which is then connected to at least one and preferably ten light fixtures 16. A central processor 58 is in communication with and controls each DMX controller 54. An example central processor 58 is manufactured by Animated Lighting of Overland Park, Kans. under the trademark "MONSTER BRAIN." Multiple central processors 58 may be required based on the number of light fixtures 16 in operation.

Once the location of each light fixture 16 on the display 10 is selected, the selected image 14 may be designed using the bit map grid, which preferably illustrates each individual light fixture 16 as a pixel. Based on the location of the pixels on the grid, each pixel is assigned lighting characteristics, such as color, intensity, and animation characteristics, as referenced at step 32. If the image 14 to be displayed is a flag, for example, specific pixels necessary for displaying the flag are selected for color and animation. Because the present invention can produce multi-colored images 14, the color of each individual pixel to produce the image 14 must be selected. Lastly, if the image 14 is to be animated, the type of animation must be selected. The image 14 may be animated using Animation Control Language ("ACL") software, which is customized for producing animated lighting designs, although other suitable lighting animation software programs may be used.

After the light fixtures 16 have been mounted to the building surface 12 and assigned their lighting characteristics, the optimal angular orientation of each light fixture 16 must be determined, referenced at step 34. As illustrated in FIG. 2, the light fixture 16 is operable to rotate about two axes. A first axis, referenced at letter A, is generally transverse to the junction box 52 and mounting assembly 46. A second axis, referenced at letter B, is positioned generally vertically through the light fixture 16. Due to the possible rotation about the axes referenced at letters A and B, the light fixture 16 is operable to be positioned in a plurality of viewing locations. This is especially advantageous when setting the angular orientation of the light fixture 16 for viewing in the display 10.

It is also noted that unlike incandescent bulbs, the intensity of the light emanating from the LED is dependent on the direction towards which the LED is focused due to LEDs projecting light, as discussed above. Because LEDs project light, it is preferable to optimally orient the light fixture having the LED so as to produce a display having characteristics suitable for the environment in which the display 10 is located.

Because of the size of the EBMD 10, it is possible that not all light fixtures 16 will be oriented in the same direction. For example, it may be desirable to orient light fixtures 16 positioned on outer edges of the EBMD 10 inwards towards a general center of the EBMD 10. Alternatively, it may be that some light fixtures 16 are positioned near windows interspersed throughout the building surface 12. It is then preferable to orient the light fixtures 16 such that the emanating light does not interfere with or shine into windows on the building surface 12.

A further consideration for orienting the light fixtures 16 is the distance and preferred vantage points from which the EBMD 10 will be viewed. As noted above, for the inside surface, the EBMD 10 will likely not be viewed from as far a distance as the EBMD 10 on the outside surface, nor will the EBMD 10 likely be as large as for the outside surface. Therefore, there may not be a need to orient the light fixtures 16 surrounding the outer edge of the display 10 inwards to the general center of the display 10 to create the focused image 14. However, it may be that the room in which the inside surface is located includes columns, walls, or other structural features that interfere with viewing of the display 10. Therefore, some light fixtures 16 may then be oriented to account for such obstacles in the room.

For outside surfaces especially, the EBMD 10 will likely be viewed from several vantage points, such as a highway 60 as illustrated in FIG. 8, and these vantage points may be separated by large distances, such a several hundred feet to several miles. It is preferable that when selecting the orientation of each light fixture 16, the viewing of the EBMD 10 from each vantage point is considered. For example, if the majority of the vantage points are positioned to a general left of the EBMD 10, then it is preferable that the light fixtures 16 are oriented towards the left of the EBMD 10, as opposed to generally center or right of the EBMD 10. The light emanating from the light fixtures 16 is then focused towards the left of the EBMD 10 and towards the vantage points from which the EBMD 10 will mostly be viewed.

Once the EBMD 10 is mounted onto the building surface 12, the overall aesthetic quality of the building surface 12 is preferably uninterrupted. The light fixtures 16 preferably cannot be seen from even relatively short distances, such as two to three hundred feet. Additionally, the view into or out of the windows is not obstructed. Therefore, the light fixtures 16, and thus the EBMD 10, generally blend into the building surface 12 to provide a display that is noticeable by the passing public only when lit.

Because of the size of the EBMD 10, logistical concerns regarding mounting of the light fixtures 16 on the building surface 12 must be considered, and such concerns are unique to the EBMD 10 and its features. For example, due to the large distance between each light fixture 16 or pixel, the wiring of the light fixtures 16 must be taken into account. This is especially relevant given that the EBMD 10 does not necessarily include a common support on which wires or cables may be mounted or behind which wires may be hidden from view. Therefore, for both aesthetic and functional reasons, multiple wires interconnecting the light fixtures 16 to a power source and an intelligence source can be very extensive if such a wiring protocol is required. The present invention forgoes many such logistical concerns by incorporating intelligent light fixtures 16, each of which includes a microprocessor (not shown) and a memory (not shown) operable to receive and store lighting characteristics and information for the individual light fixture 16. Thus, the present invention allows for individually addressable light fixtures 16 for use in the large-scale EBMD 10.

As can be appreciated, if the light fixtures 16 are not intelligent, then data comprising lighting information and control instructions must be transferred across a larger bus than if the light fixtures 16 are intelligent. Therefore, the present invention requires either less bus width or allows for more data to be transferred. Use of intelligent light fixtures 16 in the large-scale display 10 also prevents having only one intelligence source driving multiple light fixtures 16. The present invention thus allows for greater flexibility when determining where the EBMD 10 may be mounted. Example intelligent light fixtures 16 are sold by Color Kinetics of Boston, Mass.

Generally, each light fixture 16 may be controlled independently of the other light fixtures 16 in the EBMD, or alternatively, clusters of light fixtures 16 may be controlled as a group, depending on the size of the EBMD 10, the image 14 to be displayed, and the desired wiring configuration. Therefore, the number of wires interconnecting the light fixtures 16 with the power source 56 and the central processor 58, such as the MONSTER BRAIN described above, is much less because the light fixtures 16 need not also be connected to a separate intelligence source.

In the preferred embodiment of the wiring configuration, each intelligent light fixture 16 includes protocol intelligence 58, such that each light fixture 16 is operable to interpret its control protocol commands communicated from the central processor 58, without first converting the control protocol via an intelligent controller, as described below in a second preferred embodiment of the wiring configuration. Therefore, each light fixture is interconnected with a protocol and power hub 62 that may be one unit, although such is not required. Additionally, each intelligent light fixture 16 is operable to receive and store its address commands and assigned color commands, and therefore, individual wires are not required to connect the light fixture 16 to an intelligence source.

Because each light fixture 16 can communicate directly with the central processor 58, the necessary hub size for controlling the plurality of light fixtures 16 on the EBMD 10 is significantly reduced. Additionally, individual protocol hubs 62 may be located proximate to the light fixtures 16. Further yet, because the light fixtures 16 of the preferred embodiment include protocol intelligence, a separate intelligent controller for converting the control protocol is not needed, as discussed above.

As particularly illustrated in FIG. 9, each intelligent light fixture 16 has one cable 64 or wire extending therefrom, with the cable 64 being operable to provide power to the light fixture 16 and carry control commands to/from the light fixture 16. Preferably, approximately ten light fixtures 16 are interconnected in a star configuration in a group or cluster, although more or less light fixtures 16 may be interconnected based on positioning on the EBMD 10, processing speed of each light fixture 16, and other requirements known to those in the art. For each group of interconnected light fixtures 16, each cable 64 extending from each light fixture 16 is connected to the protocol and power hub 62 described above. More than one group of interconnected light fixtures 16 may be connected to the protocol and power hub 62, as necessitated by positioning on the EBMD 10, capacity of the hub 62, and other known factors. Each hub 62 is then connected to the central processor 58 discussed above. Alternatively, multiple hubs 62 may be connected to the central processor 58, and multiple central processors 58 may be used as needed based on the size of the EBMD 10.

In sum, for each group of light fixtures 16 comprising ten fixtures 16, only ten cables 64 are connected to the hub 62. This is significantly less cables 64 as are required in prior art displays that do not incorporate intelligent light fixtures 16. Because the large-scale EBMD 10 can comprise several hundred light fixtures 16, reducing the number of cables 64 from three cables to one cable 64 provides increased versatility for locating and mounting the EBMD 10 and allows for faster and more elaborate animation with increased processing speed and control.

In the second preferred embodiment of the present invention illustrated in FIG. 10, each intelligent light fixture 116 on an EBMD 110, substantially similar to the intelligent light fixtures 16 and EBMD 10 of the first preferred embodiment, is connected to three wires or cables 164. A first cable 166 provides power (labeled as "power") to each light fixture 116 and is connected to a power source 156. A second cable 168 (labeled as "common") is the data/power common for the light fixtures 116 and provides power and data return and is also connected to the power source 156. A third cable 170 communicates control protocol to/from the light fixture 116. A group of ten light fixtures 116 are interconnected in a parallel configuration, as illustrated in FIG. 10.

In the second preferred embodiment, a central processor 158 is not operable to communicate control protocol directly to each light fixture 116, and thus, an intelligent controller 154, such as a DMX controller, operable to convert the control protocol so as to be understandable by the intelligent light fixture 116 is required. Therefore, each light fixture 116 is in communication with the intelligent controller 154 and a protocol hub 162, the power source 156, and the central processor 158, each of which is substantially similar to the protocol hub 62, power source 56, and central processor 58 of the first preferred embodiment. Each of the intelligent controller 154, protocol hub 162, power source 156, and central processor 158 may be separate units or may be combined as a single unit or multiple units, as is well known in the art.

As also described for the first preferred embodiment, the EBMD 110 may include several hundred light fixtures 116, such that multiple groups or clusters of light fixtures 116 are connected to the central processor 158. As such, multiple protocol hubs 162 and intelligent controllers 154 may be required for the multiple groups of light fixtures 16.

Although the invention has been described with reference to the preferred embodiment illustrated in the attached drawing figures, it is noted that equivalents may be employed and substitutions made herein without departing from the scope of the invention as recited in the claims. For example, as noted above, the mounting assembly for mounting the light fixtures 16 to the surface 12 may differ for each building surface 12 and even for varying sections on the same building surface 12. The mounting assembly is preferably operable to mount one light fixture 16, although one mounting assembly may be operable to mount more than one light fixture 16 if desired. Additionally, the light fixture 16 mounted to the surface may differ from the light fixture 16 described above, depending on cost, the type of building surface 12, i.e., inside or outside surface, and subjective preferences, such as desired manufacturers, size and aesthetic appeal of the light fixture, etc. An even further alternative to the preferred embodiment described above provides for the light fixtures 16 to be interconnected together via electrical wiring or other connection means not requiring a common support.

Having thus described the preferred embodiment of the invention, what is claimed as new and desired to be protected by Letters Patent includes the following:

1. An expanded bit map display ("EBMD") for mounting on a building surface having a plurality of irregularities associated therewith, the EBMD operable to display a plurality of images on the building surface for viewing from a distance, the EBMD comprising:

a plurality of light fixtures mounted to the building surface without use of a substrate common to all of the light fixtures or a plurality of interconnected modular substrates, wherein the plurality of light fixtures is mounted to the building surface in an irregular pattern to account for the irregularities on the building surface so that, for at least a portion of the plurality of light fixtures, a horizontal distance and a vertical distance between a first light fixture and any adjacent light fixture are approximately unequal, such that the portion of the plurality of light fixtures is mounted to the surface in a non-uniformly spaced configuration, wherein the plurality of light fixtures presents a density ratio of light fixtures per unit area of the building surface, wherein a first portion of the plurality of light fixtures has a different angular orientation than a second portion of the plurality of light fixtures so that light emitted from the first portion of the plurality of light fixtures is angled in a different direction that light emitted from the second portion of the plurality of light fixtures, and wherein when viewed from the distance, a selected one of the plurality of images displayed by the EBMD is generally uniform;

a protocol hub operable to communicate control protocol to each light fixture; and a central processor in communication with the protocol hub and operable to communicate control protocol to each light fixture via the protocol hub, such that when the plurality of light fixtures are mounted to the building surface and controlled via the central processor, the light fixtures are operable to produce the selected image.

2. The EBMD as claimed in claim 1, further comprising an intelligent controller operable to convert the control protocol communicated from the central processor so as to be understandable by the light fixture.

3. The EBMD as claimed in claim 2, wherein the intelligent controller and the protocol hub are a single unit.

4. The EBMD as claimed in claim 1, wherein the building surface has the plurality of irregularities interspersed therethrough.

5. The EBMD as claimed in claim 4, wherein the irregularities are selected from the group consisting of: windows, vents, lettering, and pipes.

6. The EBMD as claimed in claim 3, wherein each light fixture includes at least one light emitting diode.

7. The EBMD as claimed in claim 3, wherein the lighting characteristics include a color and an animation characteristic.

8. The EBMD as claimed in claim 1, wherein each light fixture is mounted to the surface without permanent destruction of the surface.

9. A method of displaying a plurality of images on a surface having a plurality irregularities associated therewith, the method comprising the steps of: mounting a plurality of light fixtures to the surface without use of a substrate common to all of the light fixtures or a plurality of interconnected modular substrates, wherein at least a portion of the light fixtures is mounted to the surface in a generally uneven configurations, wherein a horizontal distance and vertical distance between a first light fixture and any adjacent light fixture are approximately unequal; wherein the plurality of light fixtures presents a density ratio of light fixtures per unit area of the surface, positioning at least some of the light fixtures at a different angular orientation than other of the light fixtures, such that light emitted from said some of the light fixtures has a different angular orientation than light emitted from said other of the light fixtures; assigning lighting characteristics to each light fixture so as to display the plurality of images; and coupling each light fixture to a central processor operable to communicate control protocol to the light fixture.

10. The method as claimed in claim 9, wherein the irregularities are selected from the group consisting of windows, vents, lettering, and pipes.

11. The method as claimed in claim 9, wherein each light fixture includes at least one light emitting diode.

12. The method as claimed in claim 9, wherein a determination of where light fixtures can he mounted on the surface is dependent on a size and location of the irregularities.

13. The method as claimed in claim 9, wherein a determination of where light fixtures can be mounted on the surface is dependent on whether the light fixtures can be mounted to the irregularities.

14. The method as claimed in claim 9, wherein a determination of the optimal location of the light fixtures is dependent on whether the surface includes any existing structure that facilitates mounting of the light fixtures to the surface.

15. The method as claimed in claim 9, wherein the plurality of light fixtures is mounted directly to the surface.

16. The method as claimed in claim 9, wherein the plurality of light fixtures is mounted to the surface via a mounting assembly.

17. The method as claimed in claim 9, wherein the lighting characteristics assigned to each light fixture include a color and an animation characteristic.

18. The method as claimed in claim 9, wherein a determination of the angular orientation of each light fixture is dependent on at least one preferred vantage point from which to view the display.

19. The method as claimed in claim 9, wherein at least one of the plurality of images is video driven.

20. The method as claimed in claim 9, wherein the plurality of light fixtures are divided into a plurality of groups.

21. The method as claimed in claim 20, wherein each light fixture of the group is further operable to communicate with an intelligent controller that is operable to interpret the control protocol communicated from the central processor.

22. The method as claimed in claim 20, wherein the light fixtures of each group are connected in a star configuration to a protocol hub operable to direct the control protocol.

23. An expanded bit map display ("EBMD") for mounting on a building surface having a plurality of irregularities associated therewith, the EBMD operable to display a plurality of images on the building surface for viewing from a distance, the EBMD comprising:
a plurality of light fixtures mounted to the building surface without use of a substrate common to all of the light fixtures or a plurality of interconnected modular substrates,
wherein the plurality of light fixtures is mounted to the building in an irregular configuration to accommodate the irregularities on the building surface so that, for at least a portion of the plurality of light fixtures, a horizontal distance and a vertical distance between a first light fixture and any adjacent light fixture are approximately unequal, such that the portion of the plurality of light fixtures is mounted to the surface in a non-uniformly spaced configuration,
wherein the plurality of light fixtures presents a density ratio of light fixtures per unit area of the building surface, and
wherein a first portion of the plurality of light fixtures has a different angular orientation than a second portion of the plurality of light fixtures, such that light emitted from the first portion of the plurality of light fixtures is angled in a different direction that light emitted from the second portion of the plurality of light fixtures.

24. The EBMD as claimed in claim 23, wherein when the EBMD is viewed from a distance, the a selected one of the plurality of images produced by the EBMD is generally uniform.

25. The EBMD as claimed in claim 23, wherein each light fixture comprises a red, a blue, and a green LED that collectively form a pixel, the EBMD is comprised of the plurality of pixels, and the pixels collectively produce generally uniform images.

26. The EBMD as claimed in claim 23, wherein for at least some approximately equal sized areas of the building surface having light fixtures mounted thereto, the density ratio of light fixtures within the areas is approximately equal.

27. An expanded bit map display ("EBMD") for mounting on a building surface having a plurality of irregularities associated therewith, the EBMD operable to display a plurality of images on the building surface for viewing from a distance, wherein the viewed images are generally uniform and visually blended, the EBMD comprising:
a plurality of light fixtures mounted to the building surface without use of a substrate common to all of the light fixtures or a plurality of interconnected modular substrates,
wherein the plurality of light fixtures presents a density ratio of light fixtures per unit area of the building surface, wherein each light fixture represents an RBG pixel,
wherein the pixels are arranged in an irregular array to accommodate the irregularities on the building surface so that, for at least a portion of the pixels, a horizontal distance and a vertical distance between a first pixel and any adjacent pixel are approximately unequal, such that the portion of the pixels is in a non-uniformly spaced configuration,
wherein a distance separating at least some adjacent pixels is at least approximately five times greater than a width of the pixel; and
a central processor operable to communicate control protocol to each light fixture for production of the image.

28. The EBMD as claimed in claim 27, wherein a first portion of the plurality of light fixtures has a different angular orientation than a second portion of the plurality of light fixtures, such that light emitted from the first portion of the plurality of light fixtures is angled in a different direction that light emitted from the second portion of the plurality of light fixtures.

29. The EBMD as claimed in claim 27, wherein the distance separating at least some adjacent pixels is at least approximately ten times greater than the width of the pixel.

30. The EBMD as claimed in claim 27, wherein for any approximately equal sized areas of the building surface having light fixtures mounted thereto, a density of the mounted light fixtures within the areas is approximately equal.

31. The EBMD as claimed in claim 27, wherein the distance from which the images are viewed is greater than approximately 100 ft.

32. The EBMD as claimed in claim 31, wherein an area of the EBMD is at least approximately 600 ft$^2$.

33. The EBMD as claimed in claim 32, wherein the density ratio of light fixtures per unit area of the building surface is less than four light fixtures per ft$^2$.

* * * * *